(12) United States Patent
Beller et al.

(10) Patent No.: US 11,288,320 B2
(45) Date of Patent: Mar. 29, 2022

(54) METHODS AND SYSTEMS FOR PROVIDING SUGGESTIONS TO COMPLETE QUERY SESSIONS

(71) Applicant: INTERNATIONAL BUSINESS MACHINES CORPORATION, Armonk, NY (US)

(72) Inventors: Charles Beller, Baltimore, MD (US); Christopher Ackermann, Fairfax, VA (US); Kristen Summers, Takoma Park, MD (US); Rob High, Round Rock, TX (US); David McQueeney, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 198 days.

(21) Appl. No.: 16/432,732

(22) Filed: Jun. 5, 2019

(65) Prior Publication Data
US 2020/0387549 A1  Dec. 10, 2020

(51) Int. Cl.
*G06F 16/9032* (2019.01)
*G06F 16/2457* (2019.01)

(52) U.S. Cl.
CPC .. *G06F 16/90324* (2019.01); *G06F 16/24578* (2019.01)

(58) Field of Classification Search
CPC ........ G06F 16/90324; G06F 16/24578; G06F 16/335; G06F 40/295; G06F 40/279; G06F 16/156; G06F 16/3322; G06F 16/3338; G06F 16/334; G06F 16/3325; G06F 16/3326; G06F 16/3329; G06F 16/2457; G06F 16/24575; G06F 16/2462; G06F 16/332; G06F 16/3334; G06F 16/367
See application file for complete search history.

(56) References Cited

U.S. PATENT DOCUMENTS

| | | | | |
|---|---|---|---|---|
| 8,463,769 | B1* | 6/2013 | Enderton | G06F 16/951 707/713 |
| 8,856,099 | B1* | 10/2014 | Lasko | G06F 16/951 707/706 |
| 9,116,982 | B1* | 8/2015 | Stern | G06F 16/288 |
| 9,336,311 | B1* | 5/2016 | Amarilio | G06F 16/9535 |
| 9,342,626 | B1* | 5/2016 | Das | G06F 16/9535 |
| 9,436,946 | B2* | 9/2016 | Collins | G06F 16/9535 |
| 9,477,758 | B1* | 10/2016 | Tong | G06F 16/951 |
| 9,870,423 | B1 | 1/2018 | Bousquet et al. | |
| 2008/0306908 | A1* | 12/2008 | Agrawal | G06F 16/951 |
| 2009/0083262 | A1* | 3/2009 | Chang | G06F 16/9535 |
| 2009/0282033 | A1* | 11/2009 | Alshawi | G06F 16/9032 |
| 2011/0047167 | A1* | 2/2011 | Caceres | G06Q 10/10 707/749 |

(Continued)

*Primary Examiner* — David T. Brooks
(74) *Attorney, Agent, or Firm* — Griffiths & Seaton PLLC

(57) ABSTRACT

Embodiments for identifying entities relevant to queries are provided. At least one query is received from a user. The at least one query is associated with at least one entity. Results of the at least one query are analyzed to identify related entities. The related entities are analyzed based on a relevancy score and an information enhancement score for each of the related entities to generate a ranking of the related entities. At least one of the related entities is provided to the user based on the ranking of the related entities.

18 Claims, 6 Drawing Sheets

(56) References Cited

U.S. PATENT DOCUMENTS

| | | | |
|---|---|---|---|
| 2011/0078136 A1* | 3/2011 | Ronen | G06F 16/951 707/722 |
| 2012/0317088 A1* | 12/2012 | Pantel | G06F 16/972 707/706 |
| 2013/0173604 A1* | 7/2013 | Li | G06F 16/3346 707/723 |
| 2013/0238594 A1* | 9/2013 | Hong | G06F 16/24578 707/710 |
| 2014/0067846 A1* | 3/2014 | Edwards | G06F 16/24578 707/765 |
| 2014/0365454 A1 | 12/2014 | Simon et al. | |
| 2015/0161202 A1* | 6/2015 | Shapira | G06F 16/235 707/723 |
| 2015/0317317 A1* | 11/2015 | Deng | G06F 16/951 707/748 |
| 2015/0331866 A1* | 11/2015 | Shen | G06F 16/24578 707/723 |
| 2016/0063106 A1* | 3/2016 | Chai | G06F 16/951 707/722 |
| 2016/0224621 A1* | 8/2016 | Bousquet | G06F 16/9535 |
| 2017/0364519 A1* | 12/2017 | Beller | G06N 7/005 |
| 2017/0371954 A1* | 12/2017 | Kikuchi | G06F 16/3322 |
| 2020/0089692 A1* | 3/2020 | Tripathi | G06F 16/288 |
| 2020/0285648 A1* | 9/2020 | Jagan | G06F 16/2428 |

* cited by examiner

```
400
    #Initialize related entities table
    entity_pertinence= {}

For query Q in query_session:
        For the result R in result set of Q:
            For entity E in R:
                if E in entity_pertinence:
                    entity_pertinence[E]  +=maxRel(E, R)
                else:
                    entity_pertinence[E]  +=maxRel(E, R)
```

FIG. 4

```
500
    #Initialize related entities table
    control_pertinence= {}

For query Q in query_session:
        Issue a control query Q_c by selecting a name at random from all historical queries
            For the result R_c in result set of Q_c:
                For entity E in R_c:
                    if E in control_pertinence:
                        control_pertinence[E]  +=maxRel(E, R)
                    else:
                        control_pertinence[E]  +=maxRel(E, R)
```

FIG. 5

METHODS AND SYSTEMS FOR PROVIDING SUGGESTIONS TO COMPLETE QUERY SESSIONS

STATEMENT REGARDING FEDERALLY SPONSORED RESEARCH OR DEVELOPMENT

This invention was made with United States Government support under Contract No.: 2018-18010800001. The Government has certain rights in this invention.

BACKGROUND OF THE INVENTION

Field of the Invention

The present invention relates in general to computing systems, and more particularly, to various embodiments for providing suggestions to complete query sessions.

Description of the Related Art

Computing systems (and/or search algorithms) are often used to search various corpora (one or more corpus), such a one or more text-based documents, spreadsheets, etc., for references to (or mentions of) names (or other identifying terms) of entities (e.g., individuals/people, organizations, objects, places, etc.). With some systems, the results are provided to the user in document "clusters" (e.g., "bin" data structures), which may include the entity name and a collection of documents (and/or excerpts from documents) that include references to (or mentions of) the entity, perhaps along with entities that are determined to be related to the target (or intended) entity.

In some instances, users have a particular set of individuals in mind that may be considered to form a "network" (i.e., a group of related entities). However, the user may be unaware of some entities that could be considered to be part of the network, and as such, may not explicitly search for them.

SUMMARY OF THE INVENTION

Various embodiments for identifying entities relevant to queries, by a processor, are provided. At least one query is received from a user. The at least one query is associated with at least one entity. Results of the at least one query are analyzed to identify related entities. The related entities are analyzed based on a relevancy score and an information enhancement score for each of the related entities to generate a ranking of the related entities. At least one of the related entities is provided to the user based on the ranking of the related entities.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 illustrates an example of pseudocode which may be associated with a method for calculating a relevancy score for a related entity according to an embodiment of the present invention;

FIG. 5 illustrates an example of pseudocode which may be associated with a method for calculating a control relevancy score for a related entity according to an embodiment of the present invention;

DETAILED DESCRIPTION OF THE DRAWINGS

Figure 1:
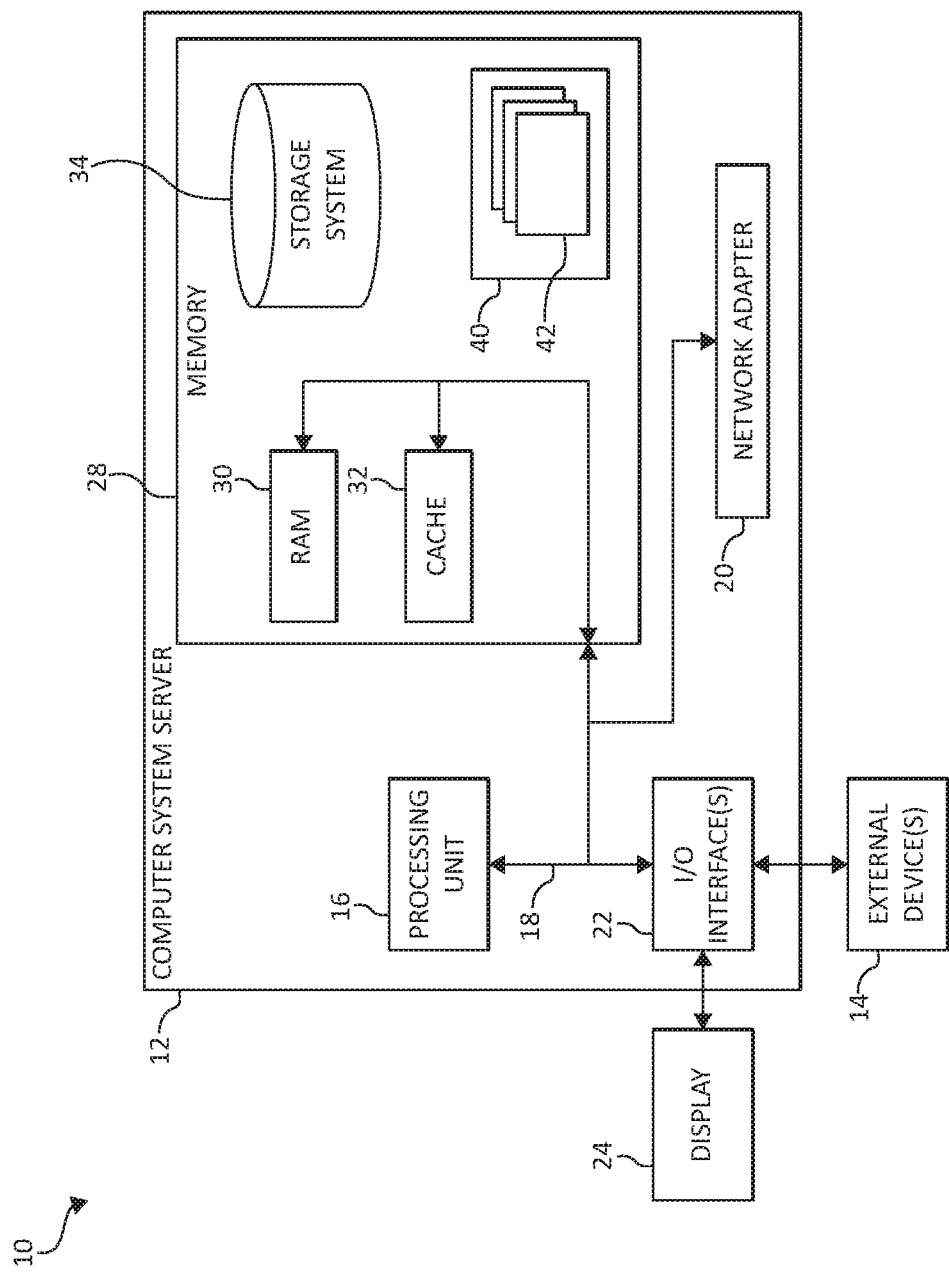
FIG. 1 is a block diagram depicting an exemplary computing node according to an embodiment of the present invention.

As discussed above, computing systems (and/or search algorithms) are often used to search various corpora (one or more corpus), such as one or more text-based documents, spreadsheets, etc., for references to (or mentions of) names (or other identifying terms) of entities (e.g., individuals/people, organizations, objects, places, etc.). With some systems, the results are provided to the user in document "clusters" (e.g., "bin" data structures), which may include the entity name and a collection of documents (and/or excerpts from documents) that include references to (or mentions of) the entity, perhaps along with entities that are determined to be related to the target (or intended) entity.

In some instances, users have a particular set of individuals in mind that may be considered to form a "network" (i.e., a group of related entities). However, the user may be unaware of some entities that could be considered to be part of the network, and as such, may not explicitly search for them.

For example, consider a scenario in which a user (or analyst) is querying (or searching) a corpus for information about several characters from a television show but not the main character from the show. Ideally, the system would be able to alert the user that may want to consider also searching for the main character (and/or automatically initiate searches for such). However, at the same time, it would be helpful for the system to be able to determine whether or not the missing entity is "obvious" to the user. That is, even if the missing entity is determined to be very relevant to the user's explicit queries, providing the missing entity as a suggested query may not be beneficial to the user (e.g., the user intentionally omitted the entity from the query because they were already aware of it).

To address these needs and/or the shortcomings in the prior art, in some embodiments described herein, methods and/or systems provide suggested queries (or target entities of queries) to a user (i.e., to assist in completing query sessions). In particular, the methods/systems may generate a list of entities that are determined to be relevant, but not obvious, to the user. The suggested entities may be derived from a set of queries and the results thereof for a particular user (or group of users), either from a single querying session (or query or predefined number of previous queries) or from a defined window of time (or time frame) in the user's history. The suggested entities may also be derived from the set of related entities that are returned as part of the query responses. In some embodiments, a relevancy score and an information enhancement (or informativity) score is calculated for each of the related entities, which are used to determine how relevant and useful each of the related entities (and/or or how obvious each of the related entities) may be to the user, and perhaps rank the related entities.

For example, in some embodiments, a user's queries (or querying session(s)) are monitored and/or tracked, such as for entities that may be related to the user's queries (or target entities), as described in greater detail below. For entities (e.g., each of the entities) that are determined to be related (e.g., related across multiple queries of the user and has not been explicitly queried for), a determination of how relevant (or pertinent) the entity is to the user (and/or the user's query/queries) is made (e.g., a relevancy or pertinence score is calculated). The determination of relevancy may be based on, for example, information associated with the user (e.g., categories, subjects, etc. in the user's profile and/or a cognitive profile of the user) and/or the number of references to the entity within the search results.

In some embodiments, an additional determination regarding whether or not the entity (e.g., each of the entities) is likely to be obvious and/or known to the user already and not explicitly queried for some reason (as opposed to unknown) is made (e.g., an information enhancement (or "informativity") score is calculated). If the entity is determined to be relevant to the user (and/or the user's queries) and unlikely to be obvious to the user, the entity may be recommended (or suggested) as an additional target query (and/or a search for the entity may be automatically initiated). As such, in some embodiments, a list of entities that are determined to be relevant but not obvious to the user may be provided.

In some embodiments, a user initially performs at least one search (e.g., multiple searches/queries) using a retrieval system (or search module) by, for example, entering (or providing) one or more entity names to be searched for within a corpus. In some embodiments, the system tracks or monitors the user's queries (and the returned results) within a predetermined time window or time frame (and/or a particular number of previous queries). Based on the queries, the system identifies one or more "related entities." In some embodiments, related entities may be those that are determined to have a relationship (and/or be within a "network") with the target entity (or entities). This process may include identifying references to (or mentions of) the target entity within the corpus and analyzing the references and/or the respective documents (e.g., utilizing natural language processing (NLP) techniques and/or searching data associated with the documents, such as tags, annotations, metadata, etc.). The system may track (and/or store) a list of all entities that are determined to be related to the results of the user's queries and/or target entities (e.g., within the time frame).

The system then evaluates each of the related entities to determine if they are both relevant and "informative" to the user (and/or determine how relevant and informative each is to the user). In some embodiments, the relevancy of the related entities may be determined based on, for example, information associated with the user (e.g., categories, subjects, etc. associated with the user and/or a cognitive profile of the user). Such may be used to determine a relevancy score for each entity.

In some embodiments, the informativity of the related entities is determined (or approximated, calculated, etc.) based on a "control relevancy (or pertinence)" score, which may be determined via a length matched session of random queries (e.g., the same number of queries performed by the user within the time frame but for random target entities). Using such, an information enhancement (or informativity) score may be determined for each related entity (e.g., the ratio of the relevancy score to the control relevancy score).

As another example, the informativity may be calculated using simple counts of occurrences (or references/mentions) of related entities (i.e., rather than calculating a control relevancy score). For example, informativity of an entity may be the ratio of entity references for the user's queries divided by the count of that entity's references in an equal number of random queries.

In some embodiments, the methods and/or systems described herein utilize a cognitive analysis. The cognitive analysis may include classifying natural language, analyzing tone, and analyzing sentiment (e.g., scanning for keywords, key phrases, etc.) with respect to, for example, content (e.g., within a corpus) and communications sent to and/or received by users, and/or other available data sources. In some embodiments, natural language processing (NLP), Mel-frequency cepstral coefficients (MFCCs) (e.g., for audio content), and/or region-based convolutional neural network (R-CNN) pixel mapping (e.g., for images/videos), as are commonly understood, are used. As such, it should be understood that the methods/systems described herein may be applied to content other than text-based (or alphanumeric) content but also audio content and/or images/videos (e.g., entities referenced in audio and/or video files).

The processes described herein may utilize various information or data sources associated with users (e.g., users who provide search queries) and/or the content (e.g., the document(s), file(s), etc. within the corpus). With respect to users, the data sources may include, for example, any available data sources associated with the user. For example, in some embodiments, a profile (e.g., a cognitive profile) for the user(s) may be generated. Data sources that may be use used to generate a cognitive profile for the user(s) may include any appropriate data sources associated with the user that are accessible by the system (perhaps with the permission or authorization of the user). Examples of such data sources include, but are not limited to, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases. The cognitive profile(s) may be utilized to, for example, determine or specify the user's intended target entity, as well as determine/identify entities related to the target entity.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the searching for, discovering, and/or identifying entities that are relevant to and/or informative with respect to a user's queries, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

It should be understood that the embodiments described herein may be applied to queries for any type of entity (and/or names/identifying terms of any type of entity). That is, although some embodiments described herein are described with respect to individuals (e.g., given/family names, nicknames, etc. of individuals), the methods/systems described herein may be applied to other types of entities, such as organizations, objects, places, etc. (and/or the names/identifying terms thereof).

It should also be understood that as used herein, the term "computing node" (or simply "node") may refer to a computing device, such as a mobile electronic device or a desktop computer, and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for identifying entities relevant to queries, by a processor, is provided. At least one query is received from a user. The at least one query is associated with at least one entity. Results of the at least one query are analyzed to identify related entities. The related entities are analyzed based on a relevancy score and an information enhancement score for each of the related entities to generate a ranking of the related entities. At least one of the related entities is provided to the user based on the ranking of the related entities.

The at least one query may include a plurality of queries received within a time frame. The relevancy score for each of the related entities may be based on information associated with the user.

The information enhancement score for each of the related entities may be based on a ratio of the relevancy score for the respective entity to a control relevancy score for the respective entity determined utilizing at least one random query. The information enhancement score for each of the related entities may be based on a ratio of the number of references to the respective entity within the results of the least one query to a number of references to the respective entity within results of at least one random query.

The analyzing of the results of the at least one query may be performed utilizing a natural language processing technique. Each of the at least one entity and each of the related entities may include at least one of an individual, an organization, and a place.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
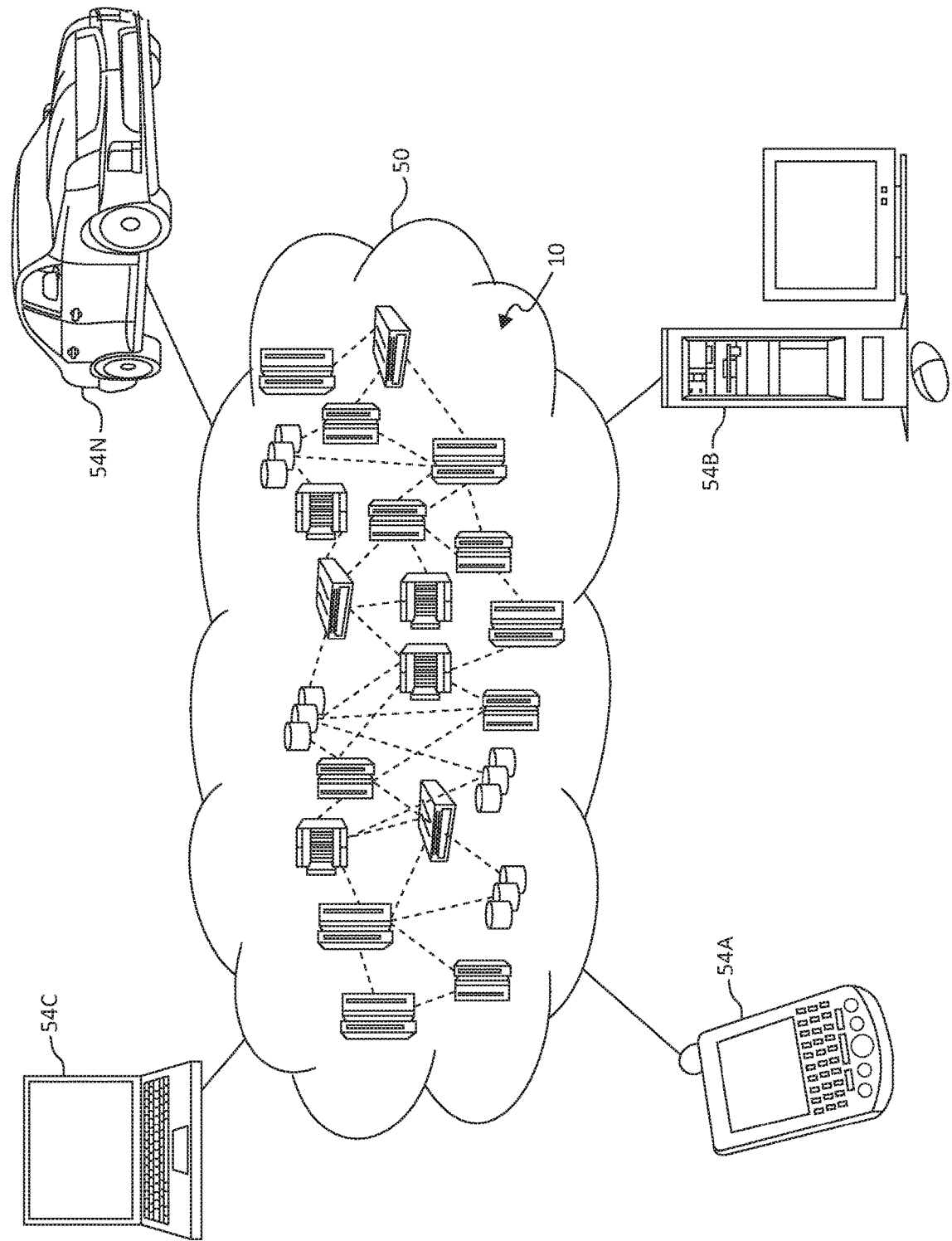
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
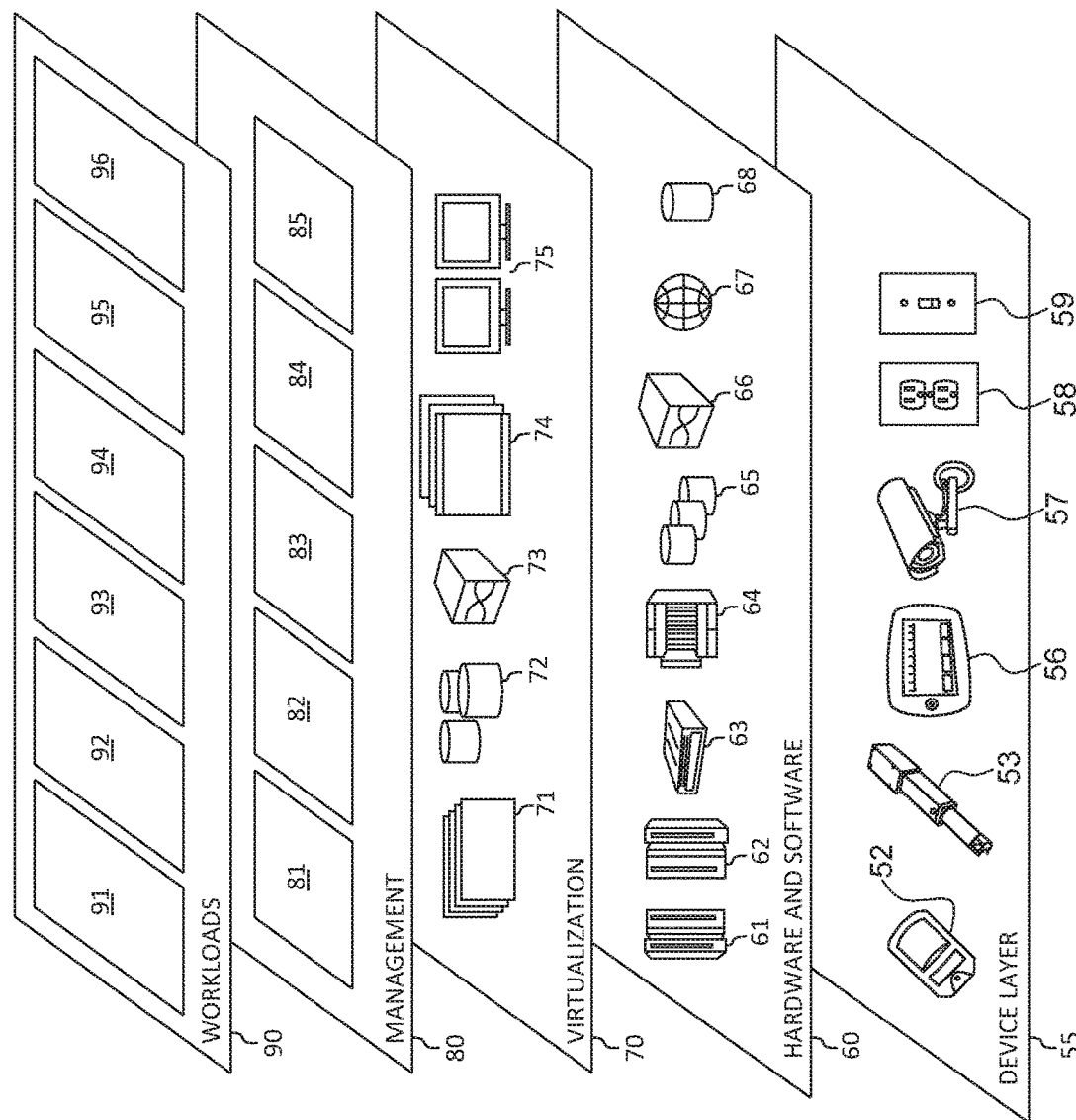
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for identifying entities are relevant to queries (and/or the user providing the query), as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems for providing suggested queries (or target entities of queries) to a user and/or identifying entities that are related to a user's queries (and/or related to entities search for by the user(s)). In particular, the methods/systems may generate a list of entities that are determined to be relevant, but not obvious, to the user. The suggested entities may be derived from a set of queries and the results thereof for a particular user (or group of users) either from a single querying session (or query or predefined number of previous queries) or from a defined window of time (or time frame) in the user's history. The suggested entities may also be derived from the set of related entities that are returned as part of the query responses. In some embodiments, a relevancy score and an information enhancement (or informativity) score is calculated for each of the related entities, which are used to determine how relevant and useful each of the related entities (and/or or how obvious each of the related entities) may be to the user, and perhaps rank the related entities.

In some embodiments, a user initially performs at least one search (e.g., multiple searches/queries) using a retrieval system (or search module) by, for example, entering (or providing) one or more entity names to be searched for within a corpus (e.g., one or more documents, such as text-based documents, unstructured data, web pages, spreadsheets, etc.). The system may search the corpus for the entity name(s) using any suitable search algorithm, such as a string-searching algorithm, as is commonly understood. Additionally, embodiments described herein may utilize any suitable solution to account for typographical and spelling errors in (and/or alternative spellings of) entity names provided by users, such as string metrics and string matching, as is commonly understood. In some embodiments, the system tracks or monitors the user's queries within a predetermined time window or time frame (and/or a particular number of previous queries). Based on the queries, the system identifies one or more related entities (i.e., related to the target entity/entities).

In some embodiments, related entities may be those that are determined to have a relationship (and/or be within a "network") with the target entity (or entities). This process may include identifying references to (or mentions of) the target entity within the corpus and analyzing the references and/or the respective documents. The identification of related entities may be performed by, for example, scanning data associated with the documents, such as metadata, tags, annotations, etc. (e.g., which may be manually entered/added by users). For example, if the target entity is a professional athlete, a document determined to include a reference to (or mention of) the athlete may also include an annotation that lists other athletes, coaches, etc. on the same team(s) as the target entity.

Also, natural language processing (NLP) techniques may be utilized, such as scanning for keywords, key phrases, etc., which may indicate that an entity is related to and/or in a network with the target entity (or the subject of the query). For example, again taking the example of the target entity being a professional athlete, NLP may be utilized to determine that a phrase such as "John Doe, who played under head coach Joe Smith . . . ," indicates that Joe Smith is related to the target entity (i.e., John Doe).

As mentioned above, in some embodiments, the system tracks all of the entities that are determined to be related to the results of the user's queries and/or target entities (e.g., within the time frame). The system then evaluates each of the related entities to determine if they are both relevant and informative to the user (and/or determine how relevant and informative each is to the user).

In some embodiments, the relevancy of the related entities may be determined based on, for example, information associated with the user. For example, the user may have a user profile (e.g., via registration with the system, a social media profile, etc.) that includes categories, subjects, labels, interests, etc. associated with the user. Additionally, a cognitive profile of the user may (also) be utilized, as described above. Such information associated with the user may be utilized to categorize the related entities, as well as determine a relevancy score for each of the related entities. The relevancy score may (also) be based on the number of references to the related entity identified within the search results (e.g., the number of times the related entity is referenced in documents that include references to the target entity).

In some embodiments, the system utilizes the relevancy scores for the related entities to generate (or create) an ordered list (e.g., from the most relevant to the least relevant). However, as described above, even related entities that are highly relevant to a user may not be a valuable and/or informative suggestion if the user is already aware of them. As such, in some embodiments, the system in effect "penalizes" entities that are determined to be uninformative (e.g., because they are obvious suggestions, "common" knowledge, etc.) by, for example, determining an information enhancement (or informativity) score for each related entity.

In some embodiments, the informativity of the related entities is determined (or approximated, calculated, etc.) based on a "control relevancy" score, which may be determined via a length matched session of random queries. That is, the control relevancy score may be determined by performing the same number of queries performed by the user within the time frame but for random target entities (e.g., selected from the user's previous queries). Specifically, if a related entity is determined to be highly pertinent in this "control" session, it may be considered to be a "background" entity that is related to many entities in the corpus, and as such, not very informative and/or useful to the user. Using such, an information enhancement (or informativity) score may be determined for each related entity. The information enhancement score may be determined as the ratio of the relevancy score to the control relevancy score (or the relevancy score divided by the control relevancy score) or vice versa.

However, in some embodiments, the informativity score may be calculated using simple counts (or numbers) of occurrences (or references/mentions) of related entities. For example, the informativity score of an entity may be calculated as the number of references of the related entity within the results (which may be considered to be a relevancy score) of the user's queries divided by the number of that entity's references in an equal number of random queries (which may be considered to be a control relevancy score), or vice versa (or a ratio thereof, as described above).

The results of the search may then be provided to the user. For example, a list of (one or more) suggested entities and/or subjects for queries may be generated and provided to the user (e.g., via an electronic communication, pop-up window, etc.). The entities may be ranked (or listed) based on descending informativity (or informativity score), as one example. As another example, the suggested entities may be listed in order of descending relevance to the user, with those of the entities with an informativity score below a predetermined threshold being filtered out or omitted from the list. In some embodiments, if none of the related entities are above a predetermined threshold, nothing may be returned (i.e., no suggested entities and/or subject for queries may be provided). The user may then initiate new queries using the suggested entities and/or such searches may be automatically initiated.

FIGS. 4 and 5 show examples of pseudocode that may be associated with methods that may be utilized by some embodiments described herein. In particular, FIG. 4 shows an example of pseudocode 400 that may be associated with a method for maintaining a running count of the relevance of each of the related entities. It should be noted that in FIG. 4 maxRel(E,R) returns the highest calculated relevance to the profile categories for entity E in result R. FIG. 5 shows an example of pseudocode 500 that may be associated with a method for calculating the control relevancy of related entities.

Figure 6:
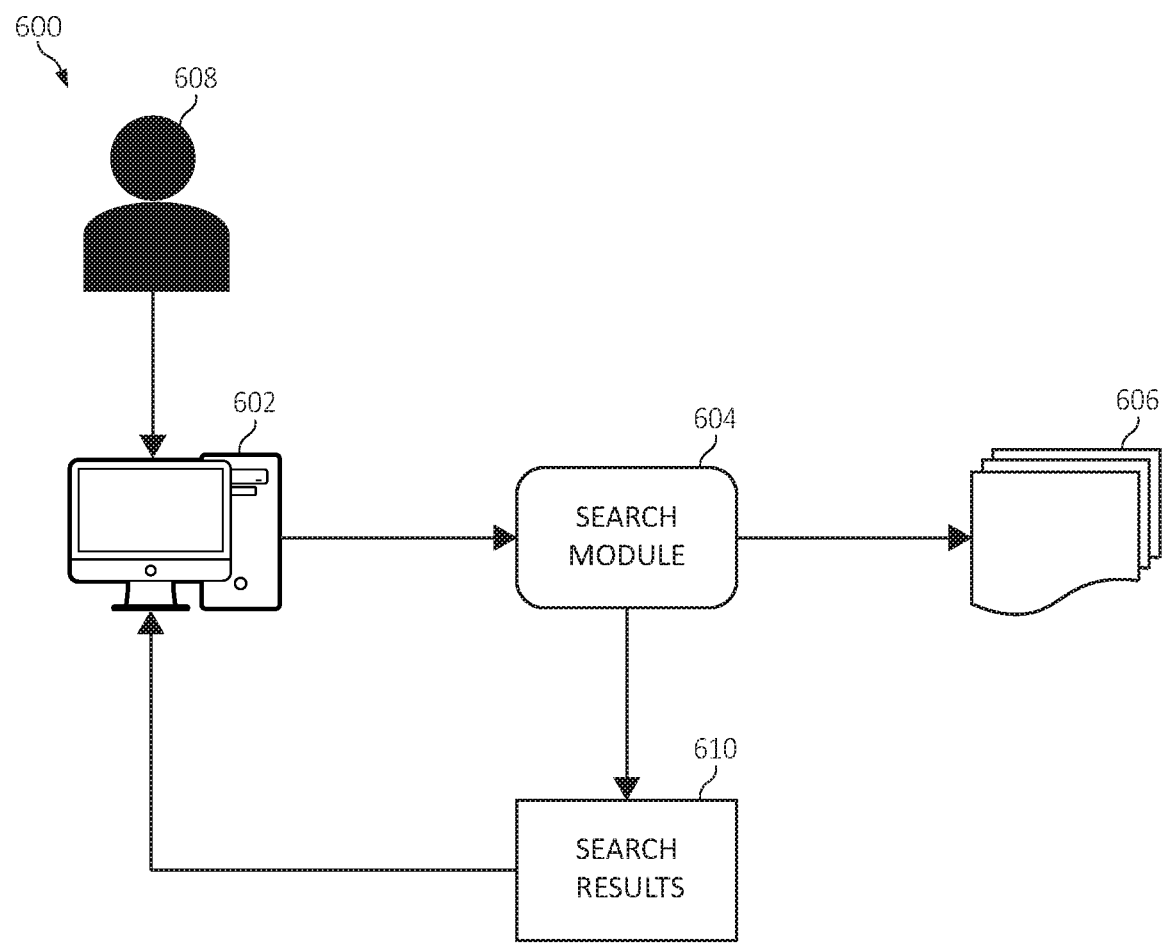
FIG. 6 is a block diagram a computing environment according to an embodiment of the present invention.

FIG. 6 illustrates an exemplary computing environment 600 in which the embodiments described herein may be implemented. In the depicted environment, the computing environment 600 includes a computing device 602, a search module 604, and a corpus 606.

The computing device (or node) 602 may be any suitable computing device, such as those described above (e.g., a desktop PC, a mobile electronic device, etc.), which may be utilized by a user (or individual) 608 to, for example, initiate a search of the corpus 606, as described herein. However, it should be understood that the methods described herein may be initiated by a computing device (or system) (e.g., automatically initiated in response to previous events, based on a schedule, etc.).

The search module 604 may include (and/or be implemented with) any suitable computing device or system, such as those described above, and may be configured to perform the searching of corpora and/or any associated processes (e.g., a cognitive analysis) and return search results 610 to the user 608 (e.g., via the computing device 602), as described above. The corpus 606 may include one or more of any type of suitable document, file, database, etc., such as unstructured documents, websites/web pages, word processing documents, spreadsheets, electronic communications (e.g., emails, text messages, etc.), audio/video files, etc., that may be accessed and/or is/are searchable by the computing device 602 and/or the search module 604. In some embodiments, the computing device 602, the search module 604, and/or the corpus 606 may be integrated into common computing devices and/or locally implemented. For example, the search module 604 may be integrated within the computing device 602. However, in some embodiments, the components shown in FIG. 6 may be remote from each other and in operable communication via any suitable communication network (e.g., the Internet).

Figure 7:
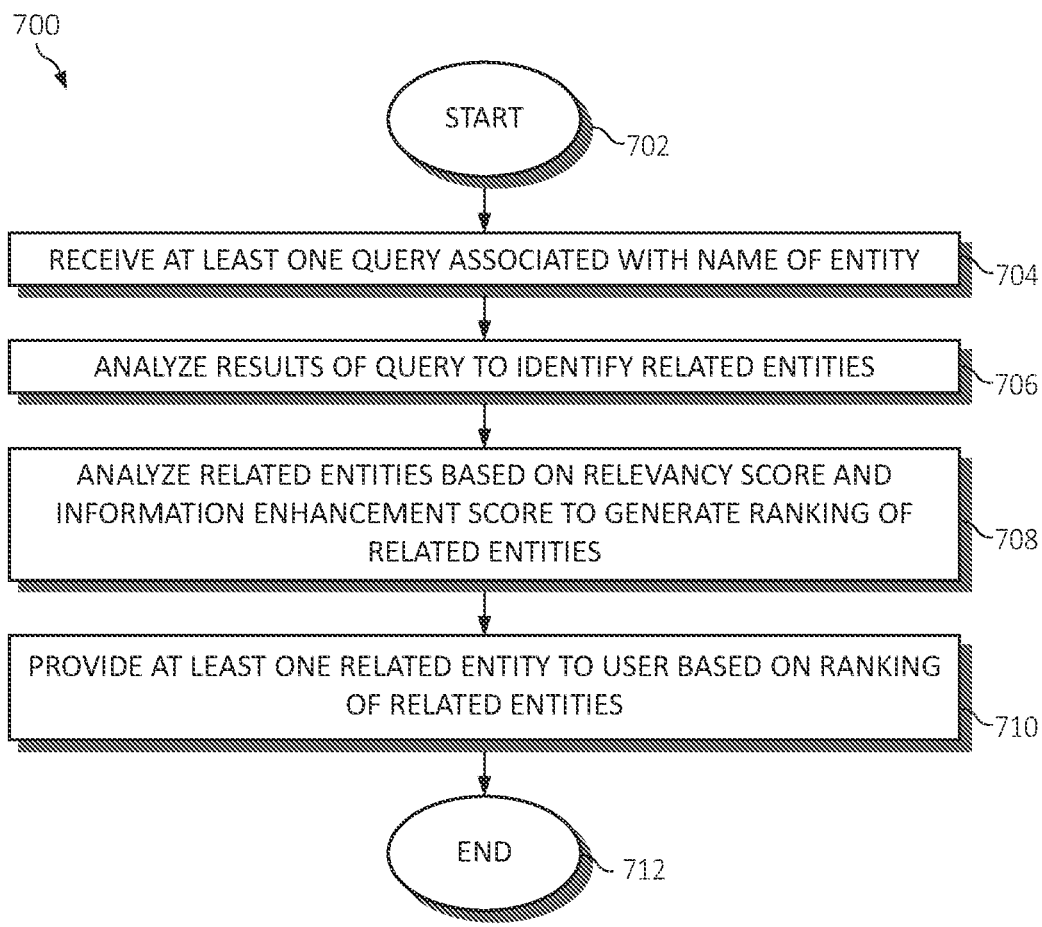
FIG. 7 is a flowchart diagram of an exemplary method for identifying entities relevant to queries according to an embodiment of the present invention.

Turning to FIG. 7, a flowchart diagram of an exemplary method 700 for identifying entities relevant to queries (and/or a user) is provided. The method 700 may be performed by, for example, the search module 604 and/or the computing device 602 in FIG. 6. The method 700 begins (step 702) with, for example, a corpus (e.g., one or more documents) being made accessible by a computing device/system and/or search module, as described above.

At least one query is received from a user (step 704). The at least one query is associated with at least one entity (e.g., the at least one query includes a request to search for one or more entities). The at least one query may include a plurality of queries received within a time frame. The results of the at least one query may be based on information associated with the user (e.g., information within a user profile and/or a cognitive profile of the user).

Results of the at least one query are analyzed to identify related entities (step 706). The analyzing of the results of the at least one query may be performed utilizing, for example, a natural language processing technique. In some embodiments, information associated with the results is utilized (e.g., document tags/annotations, metadata, etc.). Each of the at least one entity and each of the related entities may include at least one of an individual, an organization, and a place.

The related entities are analyzed based on a relevancy score and an information enhancement score for each of the related entities to generate a ranking of the related entities (step 708). The relevancy score for each of the related entities may be based, for example, information associated with the user (e.g., information within a user profile and/or a cognitive profile of the user) and/or a number of references to the respective related entity within the results of the at least one query. The information enhancement score for each of the related entities may be based on a ratio of the number of references to the respective entity within the results of the least one query to a number of references to the respective entity within results of at least one random query.

At least one of the related entities is provided to the user based on the ranking of the related entities (step 710). For example, a list of (one or more) suggested entities and/or subjects for queries may be generated and provided to the user (e.g., via an electronic communication, pop-up window, etc.). The entities may be ranked (or listed) based on descending information enhancement score, as one example. As another example, the suggested entities may be listed in order of descending relevance to the user, with those of the entities with an information enhancement score below a predetermined threshold being filtered out or omitted from the list.

Method 700 ends (step 712) with, for example, the results of the search being accepted by the user. In some embodiments, the user may provide feedback (e.g., by indicating which, if any, of the suggested entities/queries are not suitable), which may be utilized to improve the performance of the system over time. The user may then utilize the results to perform additional queries (e.g., for the suggested entities) or such a search may be automatically initiated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for identifying entities relevant to queries, by a processor, comprising:
  receiving, by the processor, at least one query from a user via a user interface associated with the processor, wherein the at least one query is associated with at least one entity to be identified within a plurality of content;
  analyzing, by the processor, results of the at least one query to identify related entities, wherein the related entities are identified by scanning data of the plurality of content, inclusive of metadata, tags, and annotations within the data, and wherein the related entities were not included in the at least one query when received;
  analyzing, by the processor, the related entities based on a relevancy score and an information enhancement score for each of the related entities to generate a ranking of the related entities, wherein the information enhancement score is representative of a determination, by the processor, of whether any respective entities of the identified related entities were intentionally omitted from the at least one query as being obvious to the user, and wherein the information enhancement score for each of the related entities is based on a ratio of the number of references to the respective entity within the results of the least one query to a number of references to the respective entity within results of at least one random query; and providing, by the processor via the user interface, at least one of the related entities to the user based on the ranking of the related entities.

2. The method of claim 1, wherein the at least one query includes a plurality of queries received within a time frame.

3. The method of claim 1, wherein the relevancy score for each of the related entities is based on information associated with the user.

4. The method of claim 3, wherein the information enhancement score for each of the related entities is further based on a ratio of the relevancy score for the respective entity to a control relevancy score for the respective entity determined utilizing the at least one random query.

5. The method of claim 1, wherein the analyzing of the results of the at least one query is performed utilizing a natural language processing technique.

6. The method of claim 1, wherein each of the at least one entity and each of the related entities comprises at least one of an individual, an organization, and a place.

7. A system for identifying entities relevant to queries comprising:
   a processor executing instructions stored in a memory device, wherein the processor:
      receives at least one query from a user via a user interface associated with the processor, wherein the at least one query is associated with at least one entity to be identified within a plurality of content;
      analyzes results of the at least one query to identify related entities, wherein the related entities are identified by scanning data of the plurality of content, inclusive of metadata, tags, and annotations within the data, and wherein the related entities were not included in the at least one query when received;
      analyzes the related entities based on a relevancy score and an information enhancement score for each of the related entities to generate a ranking of the related entities, wherein the information enhancement score is representative of a determination, by the processor, of whether any respective entities of the identified related entities were intentionally omitted from the at least one query as being obvious to the user, and wherein the information enhancement score for each of the related entities is based on a ratio of the number of references to the respective entity within the results of the least one query to a number of references to the respective entity within results of at least one random query; and
      provides, via the user interface, at least one of the related entities to the user based on the ranking of the related entities.

8. The system of claim 7, wherein the at least one query includes a plurality of queries received within a time frame.

9. The system of claim 7, wherein the relevancy score for each of the related entities is based on information associated with the user.

10. The system of claim 9, wherein the information enhancement score for each of the related entities is further based on a ratio of the relevancy score for the respective entity to a control relevancy score for the respective entity determined utilizing the at least one random query.

11. The system of claim 7, wherein the analyzing of the results of the at least one query is performed utilizing a natural language processing technique.

12. The system of claim 7, wherein each of the at least one entity and each of the related entities comprises at least one of an individual, an organization, and a place.

13. A computer program product for identifying entities relevant to queries, by a processor, the computer program product embodied on a non-transitory computer-readable storage medium having computer-readable program code portions stored therein, the computer-readable program code portions comprising:
   an executable portion that receives, by the processor, at least one query from a user via a user interface associated with the processor, wherein the at least one query is associated with at least one entity to be identified within a plurality of content;
   an executable portion that analyzes, by the processor, results of the at least one query to identify related entities, wherein the related entities are identified by scanning data of the plurality of content, inclusive of metadata, tags, and annotations within the data, and wherein the related entities were not included in the at least one query when received;
   an executable portion that analyzes, by the processor, the related entities based on a relevancy score and an information enhancement score for each of the related entities to generate a ranking of the related entities, wherein the information enhancement score is representative of a determination, by the processor, of whether any respective entities of the identified related entities were intentionally omitted from the at least one query as being obvious to the user, and wherein the information enhancement score for each of the related entities is based on a ratio of the number of references to the respective entity within the results of the least one query to a number of references to the respective entity within results of at least one random query; and
   an executable portion that provides, by the processor via the user interface, at least one of the related entities to the user based on the ranking of the related entities.

14. The computer program product of claim 13, wherein the at least one query includes a plurality of queries received within a time frame.

15. The computer program product of claim 13, wherein the relevancy score for each of the related entities is based on information associated with the user.

16. The computer program product of claim 15, wherein the information enhancement score for each of the related entities is further based on a ratio of the relevancy score for the respective entity to a control relevancy score for the respective entity determined utilizing the at least one random query.

17. The computer program product of claim 13, wherein the analyzing of the results of the at least one query is performed utilizing a natural language processing technique.

18. The computer program product of claim 13, wherein each of the at least one entity and each of the related entities comprises at least one of an individual, an organization, and a place.

* * * * *